(12) United States Patent
Nagatoshi

(10) Patent No.: US 7,482,333 B2
(45) Date of Patent: Jan. 27, 2009

(54) POLYCARBONATE RESIN COMPOSITION AND MOLDINGS THEREOF

(75) Inventor: Kikuo Nagatoshi, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 307 days.

(21) Appl. No.: 10/593,716

(22) PCT Filed: Apr. 4, 2005

(86) PCT No.: PCT/JP2005/006601

§ 371 (c)(1),
(2), (4) Date: Sep. 21, 2006

(87) PCT Pub. No.: WO2005/097896

PCT Pub. Date: Oct. 20, 2005

(65) Prior Publication Data

US 2007/0213437 A1 Sep. 13, 2007

(30) Foreign Application Priority Data

Apr. 7, 2004 (JP) .............................. 2004-113049

(51) Int. Cl.
*C08K 5/41* (2006.01)
*C08K 5/521* (2006.01)
(52) U.S. Cl. ...................................... 514/146; 524/140
(58) Field of Classification Search ................. 524/127, 524/140, 146
See application file for complete search history.

(56) References Cited

FOREIGN PATENT DOCUMENTS

| JP | 10 060248 | 3/1998 |
|---|---|---|
| JP | 11 241010 | 9/1999 |
| JP | 2000 063650 | 2/2000 |
| JP | 2002 194227 | 7/2002 |
| JP | 2002 226697 | 8/2002 |
| JP | 2005 105206 | 4/2005 |

Primary Examiner—Peter Szekely
(74) Attorney, Agent, or Firm—Oblon, Spivak, McClelland, Maier & Neustadt, P.C.

(57) ABSTRACT

The present invention provides a polycarbonate resin composition which comprises, with respect to 100 parts by mass of a component consisting of 50 to 95 mass % of an aromatic polycarbonate resin of component (A) and 5 to 50 mass % of a silicon-containing inorganic filler of component (B), 0.5 to 5 parts by mass of a phosphonium sulfonate of component (C) represented by general formula (I) and 0.05 to 3 parts by mass of a mono- or di-phosphate ester of component (D) which has a polyoxyalkylene alkyl ether or polyoxyalkylene alkylaryl ether group, and a molded article thereof. According to the present invention, although the Izod impact strength is decreased by the addition of phosphonium sulfonate of component (C) to the component obtained by blending polycarbonate resin of component (A) and inorganic filler of component (B), the impact strength is improved by the addition of phosphate ester of component (D), and also a synergetic effect is exhibited in antistatic performance by combining component (C) and component (D). Further, phosphonium sulfonate of component (C) is less hygroscopic as compared with metal sulfonates, thereby no segregation of the component as foreign bodies occurs and excellent fluidity and handling performance are provided. The present invention provides a polycarbonate resin composition which has excellent antistatic performance and improved impact strength as well as excellent fluidity and handling performance without decreasing intrinsic flame retardance and thermal stability of polycarbonate resin compositions, and a molded article thereof.

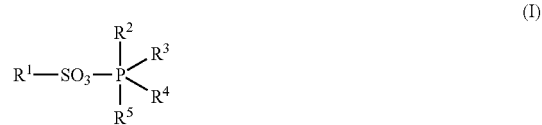

(I)

8 Claims, No Drawings

POLYCARBONATE RESIN COMPOSITION AND MOLDINGS THEREOF

TECHNICAL FIELD

The present invention relates to an antistatic polycarbonate resin composition and a molded article made of the polycarbonate resin composition. More specifically, the present invention relates to a polycarbonate resin composition having not only improved fluidity, handling performance and impact resistance but also excellent anti-static performance without lowering flame retardance and thermal stability, and a molded article thereof.

BACKGROUND ART

A polymer alloy material composed of a polycarbonate resin in which an inorganic filler such as talc is incorporated and ABS or high-impact polystyrene has been used as a principal material for housings or parts for OA (office automation) instruments and electrical or electronics instruments. This material is required to have high rigidity, thermal stability, flame retardance and impact resistance in addition to fluidity ensuring production of large-sized molded articles. Further for housings of copy machines and the like, antistatic performance is required for preventing dust adhesion. However, antistatic agent is generally hydrophilic in nature, and is hygroscopic. Consequently, there still is a wide range of problems including handling performance of polycarbonate resin compositions on production, prevention of moisture-absorption of the pellets on injection molding, and others, requiring achieving high functionality and easy operability of polycarbonate resin compositions.

As a method for imparting antistatic performance to polycarbonate resin compositions, methods in which an anionic antistatic agent including a phosphonium sulfonate, an alkali metal sulfonate, and the like is added to a polycarbonate resin are publicly known (Referenced patent documents 1 to 3).

However, phosphonium sulfonate is less hygroscopic, but severely lowers impact resistance. Alkali metal sulfonate exhibits an excellent antistatic performance, but is highly hydrophilic and is hygroscopic, having a disadvantage of changing easily into solid by absorbing moisture. Alkali metal sulfonate is not easy to disperse uniformly by blending with a Henschel mixer, etc. and tends to remain as foreign bodies.

It is publicly known that addition of a specific inorganic filler such as talc to polycarbonate resin lowers the molecular weight. This lowering of molecular weight can be prevented by mixing a phosphorus compound having a specific molecular structure as described in Reference patent document 4, but the phosphorus compound is ineffective in imparting antistatic performance.

Patent document 1: Japanese Patent Application Laid-Open (JP-A) No. S64-14267;
Patent document 2: Japanese Patent Application Laid-Open (JP-A) No. 2000-204193;
Patent document 3: Japanese Patent Application Laid-Open (JP-A) No. 2000-63650; and
Patent document 4: Japanese Patent Application Laid-Open (JP-A) No. H02-283760.

DISCLOSURE OF INVENTION

The present invention has been carried out in view of the above-described circumstances. It is an object of the present invention to provide a polycarbonate resin composition which is less hygroscopic and exhibits excellent mechanical strength, flame retardance and antistatic performance, and a molded article thereof.

The present inventors have intensively investigated to attain the above objective, and as a result, found that a polycarbonate resin which has substantially improved impact resistance, low hygroscopicity and an excellent antistatic performance is obtained by adding a specific phosphonium sulfonate and a phosphate ester which has a polyoxyalkylene alkyl ether chain or a polyoxyalkylene alkylaryl ether chain to a composition obtained by mixing a polycarbonate resin and an inorganic filler. The present invention has been accomplished based on the above findings.

Accordingly, the present invention provides a polycarbonate resin composition and a molded article thereof described as follows:

(1) A polycarbonate resin composition comprising, with respect to 100 parts by mass of a component consisting of 50 to 95 mass % of an aromatic polycarbonate resin of component (A) and 5 to 50 mass % of a silicon-containing inorganic filler of component (B), 0.5 to 5 parts by mass of a phosphonium sulfonate of component (C) represented by general formula (I),

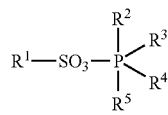

(I)

[wherein, $R^1$ is an alkyl or aryl group having 1 to 40 carbon atoms; $R^2$ to $R^5$ are, different or the same, alkyl or aryl groups having 1 to 10 carbon atoms], and 0.05 to 3 parts by mass of a mono- or di-phosphate ester of component (D) which has a polyoxyalkylene alkyl ether or polyoxyalkylene alkylaryl ether group represented by general formula (II),

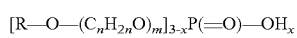

(II)

[wherein, R is an alkyl group having 1 to 18 carbon atoms or a substituted phenyl group having alkyl group(s) of 1 to 18 carbon atoms; n is an integer of 2 or 3; m is an integer of 4 to 55; x is an integer of 1 or 2].

(2) The polycarbonate resin composition according to (1), wherein the silicon-containing inorganic filler is at least one kind selected from talc, glass fiber, mica, zeolite and wollastonite.

(3) The polycarbonate resin composition according to (1) or (2), which further contains 1 to 30 parts by mass of a non-halogen phosphate ester flame retardant of component (E), with respect to 100 parts by mass of a component consisting of component (A) and component (B).

(4) The polycarbonate resin composition according to any of (1) to (3), which further contains 1 to 30 parts by mass of a styrene-based resin of component (F) modified by a rubbery polymer, with respect to 100 parts by mass of a component consisting of component (A) and component (B).

(5) The polycarbonate resin composition according to any of (1) to (4), which further contains 1 to 20 parts by mass of a core-shell type grafted-rubbery elastomer of component (G), with respect to 100 parts by mass of a component consisting of component (A) and component (B).

(6) The polycarbonate resin composition according to any of (1) to (5), which further contains 0.05 to 2 parts by mass of a polytetrafluoroethylene of component (H) capable of forming fibrils, with respect to 100 parts by mass of a component consisting of component (A) and component (B).

(7) The molded article made of a polycarbonate resin composition according to any of (1) to (6).

(8) The molded article according to (7), which is a housing or parts for OA instruments, electronic or electrical instruments, or home electric appliances.

BEST MODE FOR CARRYING OUT THE INVENTION

The present invention is described below in detail.

Firstly, as an aromatic polycarbonate resin which is component (A) composing the polycarbonate resin composition according to the present invention, there is no specific limitation on its chemical structure and method of production and there may be used various kinds of resins. For example, an aromatic polycarbonate resin is preferably used which is produced through the reaction between dihydric phenol and carbonate precursor.

There may be mentioned various kinds of the above-described dihydric phenols, for example, preferably 2,2-bis(4-hydroxyphenyl)propane, bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cyclohexane, bis(4-hydroxyphenyl) ether, bis(4-hydroxyphenyl)sulfide, bis(4-hydroxyphenyl)sulfone, bis(4-hydroxyphenyl)sulfoxide, bis(4-hydroxyphenyl) ketone, hydroquinone, resorcin, catechol and the like.

Among these dihydric phenols, bis(hydroxyphenyl)alkane, particularly 2,2-bis(4-hydroxyphenyl)propane [bisphenol A] is preferable. These dihydric phenols can be used solely or two or more kinds in combination.

As the carbonate precursor, a carbonyl halide, a carbonyl ester, a haloformate and the like is used. Specific examples are phosgene and dihaloformate, diphenylcarbonate, dimethylcarbonate, and diethylcarbonate of dihydric phenol and the like.

The aromatic polycarbonate resins of component (A) can have a chemical structure with a molecular chain of linear, cyclic, or branched. Among them, a polycarbonate resin is preferably used which has a branched structure and is produced by using a branching agent such as 1,1,1-tris(4-hydroxyphenyl) ethane, a,a',a''-tris(4-hydroxyphenyl)-1,3,5-triisopropylbenzene, phloroglucin, trimellitic acid, isatin bis(o-cresol) and the like. In addition, as the polycarbonate resin, a polyester polycarbonate resin can be used which is produced by using a bifunctional carboxylic acid such as terephthalic acid or an ester precursor such as an ester-forming derivative of the bifunctional carboxylic acid. Further, a mixture of these polycarbonate resins which have these various chemical structures can be used.

The polycarbonate resins have a viscosity average molecular weight of generally 10,000 to 50,000, preferably 13,000 to 35,000, more preferably 15,000 to 25,000. The viscosity average molecular weight (Mv) is determined as follows: the viscosity of a methylene chloride solution is measured at 20° C. with Ubbelohde viscometer; a limiting viscosity [η] is obtained from thus measured viscosity; then, Mv is calculated from [η] by using the following equation:

$$[\eta]=1.23\times10^{-5}Mv^{0.83}.$$

For the modification of the molecular weight of the polycarbonate resins, phenol, p-tert-butylphenol, p-tert-octylphenol, p-cumylphenol or the like is used.

Further, as the polycarbonate resin of component (A) a polycarbonate-polyorganosiloxane copolymer can be used. The copolymer is prepared as: a polycarbonate oligomer and a polyorganosiloxane having functional groups on its molecular ends are dissolved in a solvent such as methylene chloride; an aqueous sodium hydroxide solution of dihydric phenols is added to the resultant solution; then the solution is subjected to interfacial polycondensation using a catalyst such as triethylamine. In this case, a polyorganosiloxane having a structure of poly(dimethylsiloxane), poly(diethylsiloxane,) poly(methylphenylsiloxane), or poly(diphenylsiloxane) is suitably used.

Further, as the polycarbonate-polyorganosiloxane copolymer, a copolymer is suitably used which has a polycarbonate moiety having a polymerization degree of 3 to 100 and a polyorganosiloxane moiety having a polymerization degree of 2 to 500.

The amount of polyorganosiloxane moiety contained in the polycarbonate-polyorganosiloxane copolymer is 0.5 to 30 mass %, preferably 1 to 20 mass %.

The polycarbonate-polyorganosiloxane copolymer has a viscosity average molecular weight of 5,000 to 100,000, preferably 10,000 to 30,000.

As the silicon-containing inorganic filler of component (B), any inorganic filler which contains silicon, preferably talc, glass fiber, mica, zeolite, or wollastonite can be used without limitation. Talc is a hydrated silicate mineral of magnesium, either natural or synthetic talc can be used. In view of color, talc which contains 3 mass % or less of iron oxide as impurity is preferred.

As the above-described mica, any one of muscovite, phlogopite, biotite, synthetic mica and the like can be used. Wollastonite is substantially represented by the chemical formula of $CaSiO_3$, and contains generally about 50 mass % of $SiO_2$, about 47 mass % of CaO, and the rest of $Fe_2O_3$ and $Al_2O_3$. Wollastonite means pulverized and classified rude ore of wollastonite. The average particle diameter of talc, mica, or wollastonite is preferably 0.1 to 100 μm, more preferably 0.1 to 50 μm in view of workability or appearance of resultant molded articles.

As the glass fiber, any glass fiber made from alkali glass, low-alkali glass, non-alkali glass and the like can be used preferably. The length of the glass fiber is in the range of preferably 0.1 to 8 mm, more preferably 0.3 to 6 mm, and the diameter of the fiber is in the range of 0.1 to 30 μm, more preferably 0.5 to 25 μm. There is no specific limitation on the shape of the glass fiber. Glass fiber having any shape including, for example, roving, milled fiber, chopped strand and the like can be used.

Zeolite is a crystalline aluminosilicate. Either natural or synthetic zeolite can be used. The average particle diameter of zeolite is preferably 0.1 to 5 μm.

The above-described silicon-containing inorganic filler can be treated with a surface treatment chemical such as a silane-coupling agent, a titanate-coupling agent and the like. The silane-coupling agent includes, for example, epoxysilane, aminosilane, vinylsilane and the like. The titanate-coupling agent includes, for example, monoalkoxy type, chelate type, coordinate type and the like.

Among these silicon-containing inorganic fillers, talc having a plate-like shape is particularly preferable. Especially talc having an average particle diameter of 0.2 to 20 μm is preferably used.

A component consisting of component (A) and component (B) in the polycarbonate resin composition according to the present invention contains 50 to 95 mass %, preferably 70 to 95 mass % of an aromatic polycarbonate resin of component (A) and 5 to 50 mass %, preferably 5 to 30 mass % of a silicon-containing inorganic filler of component (B). By specifying the content of polycarbonate resin of component (A) in 50 mass % or more, the intrinsic heat resistance and mechanical strength of polycarbonate resins are maintained sufficiently, and by specifying the content of silicon-containing inorganic filler of component (B) in 5 mass % or more, rigidity and others are improved.

In the present invention, as component (C) a phosphonium sulfonate represented by general formula (I) is used.

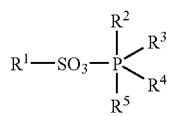
(I)

wherein, $R^1$ is an alkyl or aryl group having 1 to 40 carbon atoms; $R^2$ to $R^5$ are, different or the same, alkyl or aryl groups having 1 to 10 carbon atoms.

The alkyl group for $R^1$ is preferably an alkyl group having 1 to 15 carbon atoms, particularly preferably hexyl or dodecyl group. The alkyl group for $R^2$ to $R^5$ is preferably an alkyl group having 1 to 5 carbon atoms, particularly preferably propyl or butyl group. The aryl group includes phenyl group, naphthyl group and the like.

The compound represented by formula (I) includes, specifically, tetramethylphosphonium hexylsulfonate, tetraethylphosphonium hexylsulfonate, tetrabutylphosphonium hexylsulfonate, tetrahexylphosphonium hexylsulfonate, tetraoctylphosphonium hexylsulfonate, tetramethylphosphonium octylsulfonate, tetraethylphosphonium octylsulfonate, tetrabutylphosphonium octylsulfonate, tetrahexylphosphonium octylsulfonate, tetraoctylphosphonium octylsulfonate, tetramethylphosphonium decylsulfonate, tetraethylphosphonium decylsulfonate, tetrabutylphosphonium decylsulfonate, tetrahexylphosphonium decylsulfonate, tetraoctylphosphonium decylsulfonate, tetramethylphosphonium dodecylsulfonate, tetraethylphosphonium dodecylsulfonate, tetrabutylphosphonium dodecylsulfonate, tetrahexylphosphonium dodecylsulfonate, tetraoctylphosphonium dodecylsulfonate, tetramethylphosphonium hexadecylsulfonate, tetraethylphosphonium hexadecylsulfonate, tetrabutylphosphonium hexadecylsulfonate, tetrahexylphosphonium hexadecylsulfonate, tetraoctylphosphonium hexadecylsulfonate, tetramethylphosphonium benzenesulfonate, tetraethylphosphonium benzenesulfonate, tetrabutylphosphonium benzenesulfonate, tetrahexylphosphonium benzenesulfonate, tetraoctylphosphonium benzenesulfonate, tetramethylphosphonium toluenesulfonate, tetraethylphosphonium toluenesulfonate, tetrabutylphosphonium toluenesulfonate, tetrahexylphosphonium toluenesulfonate, tetraoctylphosphonium toluenesulfonate, tetramethylphosphonium dodecylbenzenesulfonate, tetraethylphosphonium dodecylbenzenesulfonate, tetrabutylphosphonium dodecylbenzenesulfonate, tetrahexylphosphonium dodecylbenzenesulfonate, tetraoctylphosphonium dodecylbenzenesulfonate and the like.

The used amount of phosphonium sulfonate of component (C) represented by general formula (I) is 0.5 to 5 parts by mass, preferably 0.8 to 3 parts by mass, more preferably 1 to 2 parts by mass with respect to 100 parts by mass of the above-described resin component consisting of component (A) and component (B). Sufficient antistatic performance can be obtained without lowering the other physical properties when the used amount of the phosphonium sulfonate represented by general formula (I) is selected in the range of 0.5 to 5 parts by mass. The phosphonium sulfonate represented by general formula (I) is less hygroscopic as compared with metal sulfonate such as sodium sulfonate and exhibits an excellent performance in handling performance.

In the present invention, as component (D) there is used mono- or di-phosphate ester which has a polyoxyalkylene alkyl ether group or a polyoxyalkylene alkylaryl ether group and is represented by general formula (II),

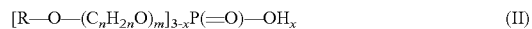
(II)

wherein, R is an alkyl group having 1 to 18 carbon atoms or a substituted phenyl group having an alkyl group with 1 to 18 carbon atoms; n is an integer of 2 or 3; m is an integer of 4 to 55; x is an integer of 1 or 2.

The polyoxyalkylene alkyl ether phosphate ester or polyoxyalkylene alkylaryl ether phosphate ester includes, for example, polyoxyethylene (m=4 to 10) octylether phosphate ester (x=1 or 2), polyoxyethylene (m=4 to 10) nonylether phosphate ester (x=1 or 2), polyoxyethylene (m=4 to 10) decylether phosphate ester (x=1 or 2), polyoxyethylene (m=4 to 10) dodecylether phosphate ester (x=1 or 2), polyoxyethylene (m=4 to 10) tridecylether phosphate ester (x=1 or 2), polyoxyethylene (m=5 to 55) octylphenylether phosphate ester (x=1 or 2), polyoxyethylene (m=5 to 55) nonylphenylether phosphate ester (x=1 or 2), polyoxyethylene (m=5 to 55) dodecylphenylether phosphate ester (x=1 or 2), polyoxypropylene (m=4 to 10) octylether phosphate ester (x=1 or 2), polyoxypropylene (m=4 to 10) nonylether phosphate ester (x=1 or 2), polyoxypropylene (m=4 to 10) decylether phosphate ester (x=1 or 2), polyoxypropylene (m=4 to 10) dodecylether phosphate ester (x=1 or 2), polyoxypropylene (m=4 to 10) tridecylether phosphate ester (x=1 or 2), polyoxypropylene (m=5 to 55) octylphenylether phosphate ester (x=1 or 2), polyoxypropylene (m=5 to 55) nonylphenylether phosphate ester (x=1 or 2), polyoxypropylene (m=5 to 55) dodecylphenylether phosphate ester (x=1 or 2) and the like. Among them, polyoxyethyelne (m=4 to 10) tridecylether phosphate ester (x=1 or 2) and/or, polyoxyethylene (m=5 to 55) nonylphenylether phosphate ester (x=1 or 2) and/or, polyoxypropylene (m=4 to 10) tridecylether phosphate ester (x=1 or 2) and/or polyoxypropylene (m=5 to 55) nonylphenylether phosphate ester (x=1 or 2) is preferable.

The used amount of mono- or di-phosphate ester of component (D) which has a polyoxyalkylene alkyl ether group or a polyoxyalkylene alkylaryl ether group and is represented by general formula (II) is 0.05 to 3 parts by mass, preferably 0.1 to 2 parts by mass, more preferably 0.1 to 1.5 parts by mass with respect to 100 parts by mass of the above-described resin component consisting of component (A) and component (B). By using an amount of 0.05 parts by mass or more, the physical properties of the resultant composition are improved, and by using an amount of 3 parts by mass or less, decrease in the impact strength can be avoided.

The non-halogen phosphate ester flame retardant of component (E) includes, for example, a phosphate ester compound represented by the following formula (III),

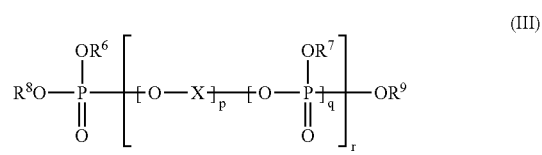
(III)

wherein, $R^6$, $R^7$, $R^8$, and $R^9$ are each independently a hydrogen atom or an organic group; X is an organic group having two or more valencies; p is 0 or 1; q is an integer of 1 or more; and r is an integer of 0 or more.

In formula (III), the organic group is a substituted or unsubstituted alkyl, cycloalkyl, or aryl group. The substituted organic group has a substituent such as an alkyl, alkoxy, aryl, aryloxy, or arylthio group. The substituent further includes an arylalkoxyalkyl group which is a combination of the above groups, or an arylsulfonylaryl group which is formed by bonding the above groups with oxygen, nitrogen, or sulfur atom.

Further, in formula (III), the organic group of X having two or more valencies is a group having two or more valencies which is given by removing one or more hydrogen atoms bonded to the carbon atoms of the above-described organic group. The organic group of X is, for example, an alkylene group, a (substituted) phenylene group, or a group derived from bisphenols that are polynuclear phenols, preferably a group derived from bisphenol A, hydoquinone, resorcinol, diphenylmethane, dihydroxydiphenyl, dihydroxynaphthalene and the like.

The non-halogen phosphate ester flame retardant of component (E) can be a monomer, an oligomer, a polymer, or a mixture thereof, specifically including, for example, trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl) phosphate, diisopropylphenyl phosphate, trixylenyl phosphate, tris(isopropylphenyl) phosphate, trinaphthyl phosphate, bisphenol A bisphosphate, hydroquinone bisphosphate, resorcin bisphosphate, resorcinol diphenyl phosphate, trioxybenzene triphosphate, cresyldiphenyl phosphate and the like.

As a commercially available non-halogen phosphate ester compound which is suitably used for the non-halogen phosphate ester flame retardant of component (E), there may be mentioned, for example, "TPP" (triphenyl phosphate), "TXP" (trixylenyl phosphate), "CR733S" (resorcinol bis (diphenyl phosphate)), "CR741" (bisphenol A bis(diphenyl phosphate)), "PX200" (1,3-phenylene-tetrakis(2,6-dimethylphenyl) phosphate ester), "PX201L" (1,4-phenylene-tetrakis(2,6-dimethylphenyl) phosphate ester), "PX202" (4,4'-biphenylene-tetrakis(2,6-dimethylphenyl) phosphate ester) and the like. All of the above-described compounds are available from DAIHACHI CHEMICAL INDUSTRY CO., LTD.

The amount of the non-halogen phosphate ester flame retardant contained in the component (E) is 1 to 30 parts by mass, preferably 5 to 25 parts by mass, particularly 10 to 15 parts by mass, with respect to 100 parts by mass of the above-described component consisting of component (A) and component (B). By using an amount of 1 part by mass or more, flame retardance can be attained, and by using an amount of 30 parts by mass or less, decrease in heat resistance and impact strength can be avoided.

The styrene-based resin of component (F) modified by a rubbery polymer is preferably an impact resistant styrene-based resin which is obtained by graft-polymerizing at least styrene monomers to a rubbery polymer. As the styrene-based resin modified by a rubbery polymer, there may be mentioned, for example, a high impact polystyrene (HIPS) obtained by polymerizing styrene to a rubbery polymer such as polybutadiene, ABS resin obtained by polymerizing acrylonitrile and styrene to polybutadiene, MBS resin obtained by polymerizing methylmethacrylate and styrene to polybutadiene, and the like. Two or more kinds of these styrene-based resins modified by a rubbery polymer can be used in combination. Also can be used a mixture of these styrene-based resins and another styrene-based resin which is not modified by a rubbery polymer.

The amount of the rubbery polymer contained in the styrene-based resin modified by a rubbery polymer is for example 2 to 50 mass %, preferably 5 to 30 mass %. By using an amount of 2 mass % or more of the rubbery polymer, impact resistance can be attained. Further, by using an amount of 50 mass % or less, it is possible to avoide such problems of decrease in thermal stability and melt fluidity, gel formation, coloring, and others. Specific examples of the above-mentioned rubbery polymer include polybutadiene, a rubbery polymer which contains acrylate and/or methacrylate, styrene-butadiene-styrene (SBS) rubber, styrene-butadiene rubber (SBR), butadiene-acrylic rubber, isoprene rubber, isoprene-styrene rubber, isoprene-acrylic rubber, ethylene-propylene rubber and the like. Among them, particularly preferable is polybutadiene. Either polybutadiene of low cis-polybutadiene (for example, containing 1 to 30 mol % of 1,2-vinyl bonding and 30 to 42 mol % of 1,4-cis bonding) or high cis-polybutadiene (for example, containing 20 mol % or less of 1,2-vinyl bonding and 78 mol % or more of 1,4-cis bonding) can be used. Further, their mixtures also can be used.

The styrene-based resin of component (F) modified by a rubbery polymer is contained in the composition in an amount of 1 to 30 parts by mass, preferably 10 to 20 parts by mass, with respect to 100 parts by mass of the above-described resin component consisting of component (A) and component (B). By using an amount of 1 part by mass or more, fluidity can be improved, while by using an amount of 30 parts by mass or less, decrease in flame retardance and impact strength is suppressed.

As the core-shell type grafted-rubbery elastomer of component (G), there may be mentioned polybutadiene, polyisoprene, styrene-butadiene-styrene (SBS) rubber, styrene-butadiene rubber (SBR), butadiene-acrylic rubber, isoprene-styrene rubber, isoprene-acrylic rubber, ethylene-propylene rubber, ethylene-propylene-diene rubber, siloxane rubber and the like.

The core-shell type has a double structure consisting of a core and a shell. The core is in a soft rubbery state and the shell around the surface of the core is in a hard resin state. The elastomer itself is in the form of powder (or particulate form). When this rubbery elastomer is melt-blended with polycarbonate resin, most of the original particle form is kept unchanged. Because most of the blended rubbery elastomer retains its original form, an effect is obtained wherein the surface layer is not peeled off.

Various kinds of the core-shell type grafted-rubbery elastomers can be listed. As a commercially available one, there may be mentioned, for example, "HIBLEN B621 "(ZEON Corp.), "EXL-2603" (Rohm & Haas Japan K. K.), "METABLEN W529", "METABLEN S2001", "METABLEN C223", "METABLEN B621"(all of them from MITSUBISHI RAYON Co., Ltd.) and the like.

Among them, there may be mentioned, for example, a polymer which is obtained by polymerizing one or two or more kinds of vinyl monomers in the presence of a rubbery polymer obtained from monomers including mainly alkyl acrylate, alkyl methacrylate, and dimethylsiloxane. An alkyl acrylate or alkyl methacrylate having a $C_2$ to $C_{10}$ alkyl group is suitable. The example includes specifically, ethyl acrylate, butyl acrylate, 2-ethylhexyl acrylate, n-octyl methacrylate and the like. As a rubbery elastomer obtained from mainly these monomers of alkyl acrylates, there may be mentioned a polymer obtained by reacting 70 mass % or more of alkyl acrylates and 30 mass % or less of the other vinyl monomer such as methyl methacrylate, acrylonitrile, vinyl acetate, or styrene which is copolymerizable with alkyl acrylates. In this case, a multi-functional monomer including divinylbenzene, ethylene dimethacrylate, triallyl cyanurate, triallyl isocyanurate and the like can be optionally added as a cross-linking agent.

The vinyl monomer which is reacted in the presence of a rubbery polymer includes, for example, an aromatic vinyl compound such as styrene or α-methyl styrene, an acrylate such as methyl acrylate or ethyl acrylate, a methacrylate such as methyl methacrylate or ethyl methacrylate, and the like. These monomers can be used solely or two or more kinds in combination, or can be copolymerized with the other vinyl polymers which include a vinyl cyanide compound such as acrylonitrile or methacrylonitrile, a vinyl ester compound such as vinyl acetate or vinyl propionate, and the like. Various methods of polymerization including bulk polymerization, suspension polymerization, emulsion polymerization and the like can be applied. Particularly, emulsion polymerization is suitable.

The core-shell type grafted-rubbery elastomer obtained in this way contains preferably 20 mass % or more of the above-described rubbery polymer. The core-shell type grafted-rubbery elastomer includes specifically MAS resin elastomers such as a grafted copolymer prepared from 60 to 80 mass % of n-butyl acrylate, styrene, and methyl methacrylate. Among these elastomers, there may be mentioned a composite-rubber grafted copolymer which is obtained by graft-polymerizing at least one kind of vinyl monomers to composite-rubber particles having an average diameter of 0.01 to 1 μm and has such a structure in which 5 to 95 mass % of a polysiloxane rubber component and 95 to 5 mass % of a polyacryl (meth) acrylate rubber component are tangled with each other so as not to be separated. The composite-rubber grafted copolymer has a higher effect of improving impact strength as compared with a copolymer which is obtained by graft-polymerization of each rubber solely. The composite-rubber grafted copolymer is commercially available as "METABLEN S-2001" (MITSUBISHI RAYON Co., Ltd.) and others.

The polytetrafluoroethylene of component (H), which is capable of forming fibrils, is a polymer or copolymer having fluoroethylene structure, including, for example, a tetrafluoroethylene polymer, a tetrafluoroethylene-hexafluoropropylene copolymer, and a copolymer of tetrafluoroethylene and ethylene based monomers without containing fluorine. The average molecular weight of polytetrafluoroethylene (PTFE) is preferably 500,000 or more, particularly preferably 500,000 to 10,000,000. Any kind of polytetrafluoroethylene which is presently known can be used.

Among polytetrafluoroethylenes, the one which has a capability of forming fibrils provides still higher performance of preventing melt-dropping. There is no particular limitation on the polytetrafluoroethylene (PTFE), which has a capability of forming fibrils, but there may be mentioned, for example, a PTFE which is classified into Type 3 in accordance with the ASTM Standards. The specific example of the PTFE includes "Teflon 6-J" (DuPont-Mitsui Fluorochemicals Company, Ltd.), "POLYFLON D-1", "POLYFLON F-103", "POLYFLON F201" (all from Daikin Industries, Ltd.), "CD076" (Asahi Glass Fluoropolymers Co., Ltd.) and the like.

Further, besides the PTFE which is classified into Type 3, there may be mentioned, for example, "Algoflon F5" (Montefluos S.p.A.), "POLYFLON MPA", or "POLYFLON FA-100" (both from Daikin Industries, Ltd.). These PTFEs can be used solely or two or more kinds in combination. The above-described PTFE which has a capability of forming fibrils is obtained, for example, by polymerizing tetrafluoroethylene in an aqueous medium in the presence of sodium, potassium or ammonium peroxydisulfide under a pressure of 1 to 100 psi at a temperature of 0 to 200° C., preferably 20 to 100° C.

The polytetrafluoroethylene of component (H) which is capable of forming fibrils is contained in an amount of 0.05 to 2 parts by mass, preferably 0.1 to 0.5 part by mass with respect to 100 parts by mass of the resin composed of (A) and (B) described above. By using an amount of 0.05 part by mass or more, the desired flame retardance of preventing melt-dropping can be attained, while by using an amount of 2 parts by mass or less adverse effects on impact strength and appearance of molded articles can be avoided. Depending on the level of flame retardance, for example, V-0, V-1, or V-2 in UL-94, which is required for a corresponding molded article, the amount of the polytetrafluoroethylene of component (H) can be selected as appropriate.

In the polycarbonate resin composition according to the present invention, besides the above-described essential and optional components, any additive which is conventionally used in thermoplastic resins can be contained upon demands. The additive includes, for example, a phenol-, phosphorus- or sulfur-based oxidation inhibitor, a benzotriazole-based or benzophenone-based UV-light absorber, a hindered amine-based light stabilizer (weathering agent), an antibacterial agent, a compatibility improver, a coloring agent (dye or pigment) and the like. There is no particular limitation on the admixed amount of the additive as long as it is within the range where the properties of the polycarbonate resin composition according to the present invention are imparted.

The method of producing the polycarbonate resin composition according to the present invention is described below. The polycarbonate resin composition according to the present invention is obtained by mixing the above-described component (A), component (B), component (C), and component (D) in a ratio above-described, optionally using component (E), component (F), component (G), and component (H) in a ratio described above, further the other components in a ratio as appropriate, then kneading the resultant mixture. Mixing and kneading can be carried out with conventional machines. For example, after preliminary mixing using a ribbon blender or a drum tumbler, mixing and kneading is carried out using a Henschel mixer, Banbury mixer, single-screw extruder, twin-screw extruder, multi-screw extruder, cokneader or the like. The heating temperature on kneading is selected in the range of generally 240 to 300° C. as appropriate. The components other than polycarbonate resin and styrene-based resin can be preliminary melt-kneaded with polycarbonate resin or styrene-based resin and therefore can be added as a master batch.

By using the polycarbonate resin composition according to the present invention, various kinds of molded articles can be produced using the above-described melt-kneading molding machine, or also can be produced by using the resultant pellets as a raw material through injection molding, injection compression molding, extrusion molding, blow molding, press molding, vacuum molding, foam molding and the like. It is particularly preferable that pellet-like raw materials are produced by the above-described melt-kneading method, and they are used to produce injection molded articles through injection molding or injection compression molding. As a method of injection molding, gas-assist injection molding can be employed so as to prevent development of surface sink or so as to obtain light-weight molded articles.

Injection molded articles including injection compression molded articles which are obtained from the polycarbonate resin composition according to the present invention are used for housings or various kinds of parts for OA instruments including copy machines, fax machines, television sets, radio receivers, tape recorders, video recorders, personal computers, printers, telephones, communication terminal machines, refrigerators, microwave ovens and the like, electrical and electronic instruments and home electric appliances, further used in the other fields of applications including automobile parts such as car interiors, automobile outer panels and the like.

EXAMPLES

The present invention will be further described in detail with reference to the following examples, but it should be construed that the invention is in no way limited to those examples.

Performance evaluations were carried out according to the following methods of measurements.

(1) Flexural elasticity: was measured in accordance with ASTM D-790.
(2) Izod impact strength: was measured in accordance with ASTM D-256.
(3) Dust adhesion test:
   Flat plates having a dimension of 150 mm by 150 mm by 2 mm were molded using an injection molding machine of "IS-100EN"(Toshiba Machine Co., Ltd.) at a resin temperature of 240° C.; the flat plates were put on a holder at a spacing of 20 mm and left in a room for two weeks; dust adhesion was observed by visual inspection and evaluated as: Excellent: no dust adhesion, Good: slight dust adhesion, Fair: dust adhesion to some extent, Poor: thick dust adhesion over entire surface.
(4) UL flame retardance: was measured in accordance with UL-94.
(5) Moisture adsorption:
   100 g of pellets were put in a glass bottle (four pellets for each sample) and dried in an oven at 120° C. for 15 hours; the glass bottle was taken out of the oven and immediately sealed with a cap to have samples for the measurement at zero hour; the glass bottles with samples for the measurement at 2, 6, and 24 hours were taken out of the oven and immediately sealed with caps in the same marner, and then brought into a testing room which was conditioned at 23° C. and 50% of humidity; the pellets were transferred into simple trays made of aluminum foil having a dimension of 100 mm by 100 mm by 20 mm, and then they were left in the testing room; after being left for the given hours, the samples were transferred back to the glass bottles, which were then sealed again; and the samples were subjected to the measurement of water content.

The samples were heated at 230° C. and water content was measured by Karl Fischer's method.

Examples 1 to 13 and Comparative Examples 1 to 11

Components (A) to (H) were blended in each mixing amount shown in Tables 1 to 3, and mixed using a SUPER FLOATER (SFC-50, KAWATA MFG Co., Ltd.). The resultant mixture was kneaded using a bi-axial extruder (TEM-35, Toshiba Machine Co., Ltd.) at a resin temperature of 260° C. to obtain pellets.

The pellets were dried at 80° C. for 5 hours, and then test specimens were prepared using an injection molding machine (IS-100EN, Toshiba Machine Co., Ltd.) at a resin temperature of 240° C. The test specimens were subjected to the performance evaluations (1) to (4) described above. The results are given in Tables 1 to 3.

In all of the examples and comparative examples, "IRGANOX 1076"(Ciba Specialty Chemicals Corp.) was admixed as an oxidation inhibitor in an mount of 0.1 part by mass.

Further, in example 10 and comparative example 11, moisture adsorption was measured in accordance with the above-described method of (5). The results are given in Table 4.

The materials used for components (A) to (H) are as follows:
(A) PC: "FN1900A" (Idemitsu Petrochemical Co., Ltd.), viscosity average molecular weight of 19000;
(B) B-1: Talc, "TP-A25" (Fuji Talc Industrial Co., Ltd.),
   B-2: Wollastonite, "NYGLOS-5" (NYCO MINERALS INC.),
   B-3: Mica, "A-41" (YAMAGUCHI MICA CO., LTD.);
(C) Phosphonium sulfonate,
   C-1: Tetrabutylphosphonium dodecylbenzenesulfonate, "IPS101" (TAKEMOTO OIL & FAT Co., Ltd.),
   C-2: Tetrabutylphosphonium stearylsulfonate,
   C-3: Tetrabutylphosphonium octylsulfonate,
   C-4: Sodium dodecylbenzenesulfonate (used for comparative examples), (anionic antistatic agent, alcohol insoluble content of 0.1 mass %),
(D) Polyoxyalkylene alkyl phosphate ester,
   D-1: "Adekacol CS-141E" (Asahi Denka Co., Ltd.) (a phosphate having polyoxyethylene nonylphenylether, having a specific gravity of 1.12, containing 5 to 10% of polyoxyethylene nonylphenyl and 90% or more of polyoxyethylene nonylphenylether phosphate ester),
   D-2: Polyoxyethylene laurylether phosphate ester (m is 4 to 10 and x is 1 or 2 in general formula (II)),
   D-3: Polyoxypropylene tridecylether phosphate ester (m is 4 to 10 and x is 1 or 2 in general formula (II)),
   D-4: Phosphoric acid (used for comparative examples);
(E) Non-halogen phosphate ester flame retardant, "CR-741" (DAIHACHI CHEMICAL INDUSTRY CO., LTD.);
(F) Styrene-based resin obtained by modification of rubbery polymer, "IT44" (Ideimtsu Petrochemical Co., Ltd.);
(G) Core-shell type grafted-rubbery elastomer, "EXL-2603" (Rohm & Haas Japan K.K.); and
(H) Polytetrafluoroethylene: "CD076" (Asahi Glass Fluoropolymers Co., Ltd.)

As is apparent from the results given in Tables 1 to 3, in the examples according to the present invention, higher Izod strength is attained and dust adhesion rarely occurs.

In comparative example 10 in which phosphoric acid was used in place of phosphate ester, the results of dust adhesion test show poor antistatic performance.

In comparative example 11 in which sodium sulfonate was used in place of phosphonium sulfonate, Table 4 shows larger moisture adsorption.

TABLE 1

|  |  | Example 1 | Example 2 | Example 3 | Example 4 | Example 5 | Example 6 | Example 7 | Example 8 |
|---|---|---|---|---|---|---|---|---|---|
| Blended amount: parts by mass |  |  |  |  |  |  |  |  |  |
| (A) PC | FN1900A | 90 | 90 | 90 | 90 | 90 | 90 | 90 | 70 |
| (B) Inorganic filler |  |  |  |  |  |  |  |  |  |
| B-1 Talc | TP-A25 | 10 |  |  | 10 | 10 | 10 | 10 | 30 |
| B-2 Wollastonite | NYGLOS 5 |  | 10 |  |  |  |  |  |  |
| B-3 Mica | A-41 |  |  | 10 |  |  |  |  |  |
| Total |  | 100 | 100 | 100 | 100 | 100 | 100 | 100 | 100 |
| (C) Antistatic agent | C-1 | 1.2 | 1.2 | 1.2 |  |  | 1.2 | 1.2 | 2 |
| (Phosphonium sulfonate) | C-2 |  |  |  | 1.2 |  |  |  |  |
|  | C-3 |  |  |  |  | 1.2 |  |  |  |
| (D) Phosphate ester | D-1 | 0.4 | 0.4 | 0.4 | 0.4 | 0.4 |  |  | 1 |
|  | D-2 |  |  |  |  |  | 0.4 |  |  |
|  | D-3 |  |  |  |  |  |  | 0.4 |  |
| (E) Phosphorous-based flame retardant | CR-741 |  |  |  |  |  |  |  |  |
| (F) Styrene-based resin | IT44 |  |  |  |  |  |  |  |  |
| (G) Rubbery elastomer | EXL2603 |  |  |  |  |  |  |  |  |
| (H) Tetrafluoro-ethylene | CD076 |  |  |  |  |  |  |  |  |
| Performance evaluation |  |  |  |  |  |  |  |  |  |
| Flexural elasticity | MPa | 3800 | 3400 | 4100 | 3700 | 3700 | 3800 | 3800 | 5500 |
| Izod impact strength | KJ/m$^2$ | 12 | 7 | 10 | 11 | 11 | 12 | 11 | 9 |
| Dust adhesion test |  | Excellent | Excellent | Excellent | Excellent | Excellent | Excellent | Excellent | Excellent |

TABLE 2

|  |  | Example 9 | Example 10 | Example 11 | Example 12 | Example 13 | Comparative example 1 | Comparative example 2 | Comparative example 3 |
|---|---|---|---|---|---|---|---|---|---|
| Blended amounts: parts by mass |  |  |  |  |  |  |  |  |  |
| (A) PC | FN1900A | 90 | 85 | 85 | 85 | 85 | 90 | 90 | 90 |
| (B) Inorganic filler |  |  |  |  |  |  |  |  |  |
| B-1 Talc | TP-A25 | 10 | 15 | 15 |  |  | 10 |  |  |
| B-2 Wollastonite | NYGLOS 5 |  |  |  | 15 |  |  | 10 |  |
| B-3 Mica | A-41 |  |  |  |  | 15 |  |  | 10 |
| Total |  | 100 | 100 | 100 | 100 | 100 | 100 | 100 | 100 |
| (C) Antistatic agent | C-1 | 0.8 | 1.7 |  | 1.7 | 1.7 | 1.2 | 1.2 | 1.2 |
| (Phosphonium sulfonate) | C-2 |  |  | 1.7 |  |  |  |  |  |
|  | C-3 |  |  |  |  |  |  |  |  |
| (D) Phosphate ester | D-1 | 0.8 | 0.6 |  | 0.6 | 0.6 |  |  |  |
|  | D-2 |  |  | 0.6 |  |  |  |  |  |
|  | D-3 |  |  |  |  |  |  |  |  |
| (E) Phosphorous-based flame retardant | CR-741 |  | 14 | 14 | 14 | 14 |  |  |  |
| (F) Styrene-based resin | IT44 |  | 15 | 15 | 15 | 15 |  |  |  |
| (G) Rubbery elastomer | EXL2603 |  | 7 | 7 | 7 | 7 |  |  |  |
| (H) Tetrafluoro-ethylene | CD076 |  | 0.4 | 0.4 | 0.4 | 0.4 |  |  |  |
| Performance evaluation |  |  |  |  |  |  |  |  |  |
| Flexural elasticity | MPa | 3700 | 3500 | 3500 | 3200 | 4000 | 3700 | 3300 | 4000 |
| Izod impact strength | KJ/m$^2$ | 11 | 30 | 28 | 25 | 28 | 3 | 2 | 5 |
| Dust adhesion test |  | Good | Excellent | Excellent | Excellent | Excellent | Fair | Fair | Fair |
| UL flame retardant test |  |  | V-0 | V-0 | V-0 | V-0 |  |  |  |

TABLE 3

|  |  | Comparative example 4 | Comparative example 5 | Comparative example 6 | Comparative example 7 | Comparative example 8 | Comparative example 9 | Comparative example 10 | Comparative example 11 |
|---|---|---|---|---|---|---|---|---|---|
| Blended amounts: parts by mass |  |  |  |  |  |  |  |  |  |
| (A) PC | FN1900A | 90 | 90 | 90 | 90 | 85 | 85 | 85 | 85 |
| (B) Inorganic filler |  |  |  |  |  |  |  |  |  |

TABLE 3-continued

| | | Comparative example 4 | Comparative example 5 | Comparative example 6 | Comparative example 7 | Comparative example 8 | Comparative example 9 | Comparative example 10 | Comparative example 11 |
|---|---|---|---|---|---|---|---|---|---|
| B-1 Talc | TP-A25 | 10 | 10 | 10 | 10 | 15 | | 15 | 15 |
| B-2 Wollastonite | NYGLOS 5 | | | | | | | | |
| B-3 Mica | A-41 | | | | | | 15 | | |
| Total | | 100 | 100 | 100 | 100 | 100 | 100 | 100 | 100 |
| (C) Antistatic agent | C-1 | | | 6 | 0.4 | 1.7 | 1.7 | 1.7 | |
| (Phosphonium sulfonate) | C-2 | 1.2 | | | | | | | |
| | C-3 | | 1.2 | | | | | | |
| (Sodium sulfonate) | C-4 | | | | | | | | 2 |
| (D) Phosphate ester | D-1 | | | 0.1 | 2 | | | | |
| Phosphoric acid | D-4 | | | | | | | 0.6 | |
| (E) Phosphorous-based flame retardant | CR-741 | | | | | 14 | 14 | 14 | 14 |
| (F) Styrene-based resin | IT44 | | | | | 15 | 15 | 15 | 15 |
| (G) Rubbery elastomer | EXL2603 | | | | | 7 | 7 | 7 | 7 |
| (H) Tetrafluoro-ethylene | CD076 | | | | | 0.4 | 0.4 | 0.4 | 0.4 |
| Performance evaluation | | | | | | | | | |
| Flexural elasticity | MPa | 3700 | 3700 | 3000 | 3200 | 3200 | 3800 | 3100 | 3000 |
| Izod impact strength | KJ/m² | 3 | 3 | 4 | 10 | 13 | 11 | 20 | 30 |
| Dust adhesion test | | Fair | Fair | Excellent | Poor | Fair | Fair | Fair | Excellent |
| UL flame retardant test | | | | | | V-0 | V-0 | V-1 | V-0 |

TABLE 4

| Moisture adsorption (μg/g) | Example 10 | Comparative example 11 |
|---|---|---|
| 0 hour | 100 | 160 |
| 2 hours | 400 | 620 |
| 6 hours | 610 | 930 |
| 24 hours | 980 | 1600 |

INDUSTRIAL APPLICABILITY

In the present invention, Izod impact strength is decreased by addition of phosphonium sulfonate of component (C) as an antistatic agent to a composition which is obtained by blending polycarbonate resin of component (A) and silicon-containing inorganic filler of component (B), as compared with a similar composition to which component (C) is not added. Impact strength is greatly enhanced by addition of a phosphate ester of component (D) which has a polyoxyalkylene alkyl ether or polyoxyalkylene alkylaryl ether group, as compared with a similar composition to which only phosphonium sulfonate is added.

The composition acquires still higher antistatic performance by using in combination phosphonium sulfonate of component (C) and phosphate ester of component (D) which has a polyoxyalkylene alkyl ether or polyoxyalkylene alkylaryl ether group, as compared with a similar composition which contains only the phosphonium sulfonate, whereby synergetic effect is confirmed to be exhibited in antistatic performance. Flame retardance is still maintained even if non-halogen phosphate ester of component (E) is further added.

When the moisture adsorption of pellets obtained from the composition to which sodium sulfonate was added is compared with that of pellets obtained from another composition to which phosphonium sulfonate (C) was added, the adsorption of the latter is about 60% of that of the former, whereby the latter is confirmed to be less hygroscopic as compared with the former. Therefore, phosphonium sulfonate (C) is less hygroscopic as compared with sodium sulfonate, exhibiting an excellent performance in handling performance.

In addition, incorporation of a non-halogen phosphate ester of component (E) and further a fluoro-olefin resin of component (H) as flame retardant provides flame retardance while maintaining moldability, impact strength, and other physical properties. Further, incorporation of a core-shell type grafted-rubbery elastic polymer or an inorganic filler widens the ranges of impact strength, rigidity, heat resistance, and flame retardance which are required for molded articles. Still further, a non-halogen phosphate ester of component (E) can be used as a flame retardant, thereby the problem of environmental pollution can be solved.

As mentioned above, the polycarbonate resin composition according to the present invention exhibits excellent properties of moldability, impact strength, rigidity, heat resistance, flame retardance, and antistatic performance, further meets handling performance and problems of environmental pollution. The. composition provides injection molded articles which satisfy requirements for various kinds of parts having high performance as well as housings used in the electrical and electronics fields, whereby wider application can be expected in these fields.

The invention claimed is:

1. A polycarbonate resin composition comprising:
with respect to 100 parts by mass of a component comprising
50 to 95 mass % of component (A) an aromatic polycarbonate resin and 5 to 50 mass % of component (B) a silicon-containing inorganic filler,
0.5 to 5 parts by mass of component (C) a phosphonium sulfonate represented by general formula (I),

wherein, $R^1$ is an alkyl or aryl group having 1 to 40 carbon atoms; and $R^2$ to $R^5$ are, different or the same, alkyl or aryl groups having 1 to 10 carbon atoms, and 0.05 to 3 parts by mass of component (D) a mono- or di-phosphate ester which has a polyoxyalkylene alkyl ether or polyoxyalkylene alkylaryl ether group represented by general formula (II), $$[R-O-(C_nH_{2n}O)_m]_{3-x}P(=O)-OH_x \qquad (II)$$

wherein, R is an alkyl group having 1 to 18 carbon atoms or a substituted phenyl group having alkyl group(s) of 1 to 18 carbon atoms; n is an integer of 2 or 3; m is an integer of 4 to 55; and x is an integer of 1 or 2.

2. The polycarbonate resin composition according to claim 1, wherein said silicon-containing inorganic filler is at least one kind selected from the group consisting of talc, glass fiber, mica, zeolite, and wollastonite.

3. The polycarbonate resin composition according to claim 1, which further contains 1 to 30 parts by mass of component (E) a non-halogen-containing phosphate flame retardant, with respect to 100 parts by mass of component (A) and component (B).

4. The polycarbonate resin composition according to claim 1, which further contains 1 to 30 parts by mass of component (F) a styrene-based resin modified by a rubbery polymer, with respect to 100 parts by mass of component (A) and component (B).

5. The polycarbonate resin composition according to claim 1, which further contains 1 to 20 parts by mass of component (G) a core-shell type grafted-rubbery elastomer, with respect to 100 parts by mass of component (A) and component (B).

6. The polycarbonate resin composition according to claim 1, which further contains 0.05 to 2 parts by mass of component (H) a polytetrafluoroethylene capable of forming fibrils, with respect to 100 parts by mass of component (A) and component (B).

7. A molded article made of a polycarbonate resin composition according to claim 1.

8. The molded article according to claim 7, which is a housing or a part for office automation instruments, electronic or electrical instruments, or home electric appliances.

* * * * *